United States Patent [19]

Tusting

[11] Patent Number: 4,876,565
[45] Date of Patent: Oct. 24, 1989

[54] APPARATUS AND METHOD OF UNDERWATER OPTICAL RECORDING

[75] Inventor: Robert F. Tusting, Ft. Pierce, Fla.

[73] Assignee: Harbor Branch Oceanographic Institution, Inc., Ft. Pierce, Fla.

[21] Appl. No.: 261,334

[22] Filed: Oct. 24, 1988

[51] Int. Cl.$^4$ .............................................. G03B 3/00
[52] U.S. Cl. ........................................ 354/403; 354/64
[58] Field of Search ................................ 354/403, 64

[56] References Cited

U.S. PATENT DOCUMENTS 3,583,299  6/1971  Land ................................... 354/403
3,751,154  8/1973  Frazee et al. ......................... 354/403
4,065,778  12/1977  Harvey ................................ 354/403
4,707,094  11/1987  Tusting ................................ 354/64
4,777,501  10/1988  Caimi et al. .......................... 354/64

Primary Examiner—Russell E. Adams
Attorney, Agent, or Firm—Carroll F. Palmer

[57] ABSTRACT

Underwater photography apparatus of the type disclosed in U.S. Pat. No. 4,707,094 is improved to overcome problems from backgrounds or other "non-clear water" conditions by inclusion of a nulling loop in the operating circuitry. Such nulling loop includes a synchronous linear modulator, an algebraic subtracter, a synchronous demodulator and a low-pass filter.

11 Claims, 2 Drawing Sheets

APPARATUS AND METHOD OF UNDERWATER OPTICAL RECORDING

BACKGROUND OF THE INVENTION

1. Field of the Invention

This invention relates broadly to apparatus and methods for underwater optical recording. More particularly, it concerns improvements in such apparatus and methods that activate the system when a photographic subject is in the camera's field of view and the distance to the subject is suitable for in-focus photography.

2. Description of the Prior Art

A great number of underwater photographs are taken with cameras which have limited remote controls. This is particularly true of deep-sea 35 mm. camera systems where camera lens opening and focus are preset and the photographer must somehow arrange for the subject to be at the correct distance and within the field of view at the time of exposure.

One approach to providing better control in underwater photography would be to incorporate the ranging features of advanced, above surface cameras. Such cameras use a variety of tehniques to obtain proper exposure conditions for control. The most common is a triangulation arrangement which superimposes the images received by a pair of spaced optical receivers and provides automatic, mechanical adjustment of the lens until the received images are coincident. Microelectronics are used to perform the image comparison and thereby provide automatic focusing (see U.S. Pat. Nos. 3,435,744 & 4,313,654).

Other advanced surface cameras use microprocessor based optical-image analyzers to determine correct focus. Also, sonar systems are used in some cameras. The optical systems of the surface cameras generally use infrared light beams with reflected light intensity, image analysis and triangulation. Unfortunately, the devices and techniques developed for surface cameras are not directly transferable to underwater camera systems. Differences between the physical properties of air and water result in major differences in the propagation of light and sound in the two media. Additionally, spurious material and signals can cause many "false" exposures to occur with underwater photography while this is not a serious consideration in use of surface cameras. Therefore, a camera system which depends on the propagation of energy waves for operation must be designed for the medium in which it is to be used. Extensive development work has occurred relative to underwater photography. Such work has included use of (a) optical triggering of underwater cameras, e.g., see U.S. Pat. No. 3,446,555 and (b) sonar techniques, e.g., see U.S. Pat Nos .4,105,990; 4,335,944; 4,381,144 and 4,447,896.

Notwithstanding the extensive prior work and developments with surface and underwater camera systems, substantial improvements are needed for the underwater systems, e.g., to provide for (1) more efficient use of battery or other power, (2) saving of film and (3) mitigation of triggering of exposure by spurious materials or events. My prior invention disclosed in U.S. Pat No. 4,707,094, the contents of which are incorporated herein by reference, provided such improvements by automatic triggering of unattended underwater camera systems when a marine specimen enters the camera's field-of-view at a range which is within the camera's depth-of-focus, identified by the term FOVAR systems. Such systems were designed for use in relatively clear water in which there is little suspended material or background objects to cause an extraneous reflected signal that could be interpreted as a "subject" by the system. However, there are a number of situations for which the "clear water" conditions are not satisfied, e.g., a subject near the ocean bottom, a cluttered background, or the presence of nearly stationary objects, e.g., suspended particles, plankton, etc., within the field-of-view. For such situations, further improvements are needed for the FOVAR systems.

OBJECTS

A principal object of the invention is the provision of improved apparatus and methods for underwater photography.

Further objects include the provision of:

1. Improvements in underwater photography apparatus and methods that automatically trigger camera operation when a photographic subject is in the camera's field-of-view and that the distance to the subject is suitable for in-focus photography.

2. Improved control over the underwater volume to be photographed by selection of source/detector geometry and illumination/detection volumes.

3. Improved subject detectability and rejection of spurious signals (noise and background light) in underwater photography systems.

4. Improvements on the invention disclosed in U.S. Pat. No. 4,707,094 that compensate for lack of "clear water" conditions.

5. Camera systems that can automatically determine if there is a candidate subject in the camera's field-of-view and verify that the camera to subject range is within the exposure depth-of-field.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

SUMMARY OF THE INVENTION

The objects are accomplished, in part, in accordance with the invention by the provision of new underwater photography apparatus that can automatically determine if there is a candidate subject in the camera's field of view and verify that the camera to subject range is within the exposure depth of field (FOVAR apparatus) even in the absence of "clear water" conditions.

The invention makes an improvement on apparatus for underwater optical recording that comprises (a) a camera to record scenes in a predetermined sector forward thereof, (b) first optical means spaced apart radially from the camera to project a divergent light beam so that it intersects such predetermined sector, (c) receiver means to detect and measure the intensity of light provided with (d) second optical means spaced apart radially from said camera to view a conical volume that intersects the light beam with the intersecting peripheries of said light beam and the conical volume substantially defining such predetermined sector, and (e) signal means that is activated by the receiver means when it measures an intensity of light in such predetermined sector above a predetermined minimum value.

Broadly described, the improvement on such apparatus for optical recording comprises including therein a nulling loop in series between the receiver means (c) and the signal means (e). Such nulling loop basically comprises a synchronous linear modulator, an algebraic subtracter, a synchronous demodulator and a low-pass filter.

In preferred embodiments, the second optical means comprises a lens and a filter, the light beam from the first optical means is pulse modulated light, the receiver means is a synchronous receiver followed by an automatic nulling loop, the light beam is created by a light emitting diode driven to emit square wave modulated light and the light has a wavelength in the range between about 650 & 700 nm.

The objects of the invention are further accomplished by providing an improvement on methods for underwater optical recording in which (A) a camera records scenes in a predetermined sector forward thereof, (B) a divergent beam of modulated light is projected from a source spaced apart radially of the camera so that the beam intersects such predetermined sector, (C) light existing in a divergent conical volume the apex of which is spaced apart radially from the camera so that the conical volume intersects the light beam and the intersecting peripheries of the light beam and the conical volume substantially define such predetermined sector is detected, (D) the resulting detected light signal is analyzed to determine when it reaches an intensity above a predetermined value, and (E) the camera is automatically made to record when said value is exceeded.

Broadly described, the improvement on such methods of optical recording comprises the steps of separating said detected light signal into a low frequency component and a higher frequency component, generating a reference signal substantially identical in amplitude and polarity to that of said modulated light from the first optical means, employing said reference signal to nullify said low frequency component, and using said higher frequency component to determine when said intensity is above said predetermined value.

The objects are further accomplished by additional features and specific embodiments that are described in more detail below.

BRIEF DESCRIPTION OF THE DRAWINGS

A more complete understanding of the invention may be had by reference to the accompanying drawings in which.

DESCRIPTION OF THE PREFERRED EMBODIMENTS

Figure 1:
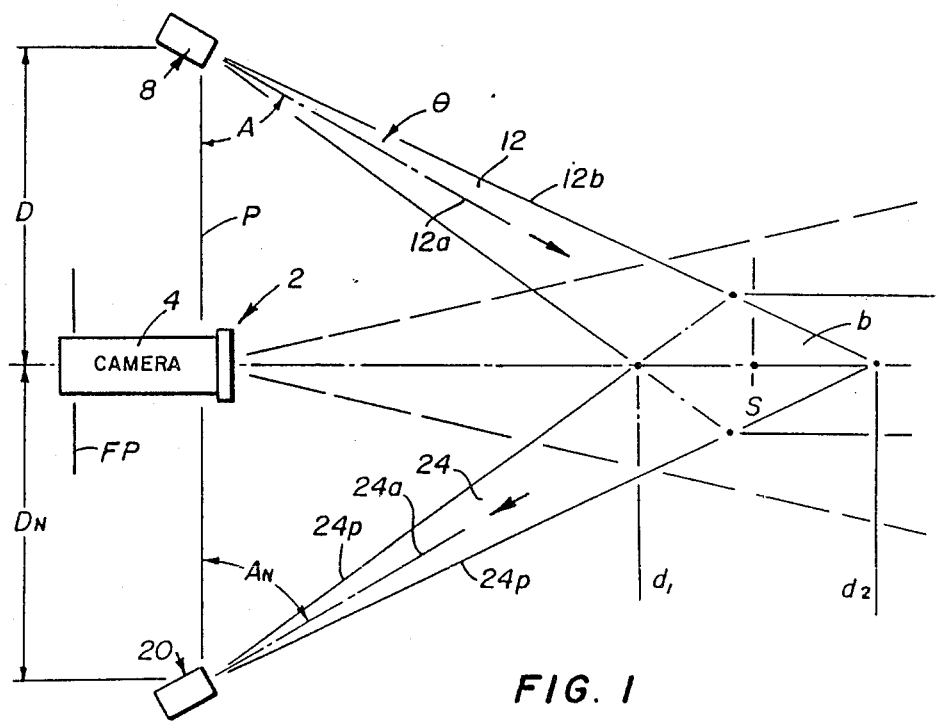
FIG. 1 is a diagrammatic representation of an improved underwater optical recording system of the invention.
Figure 2:
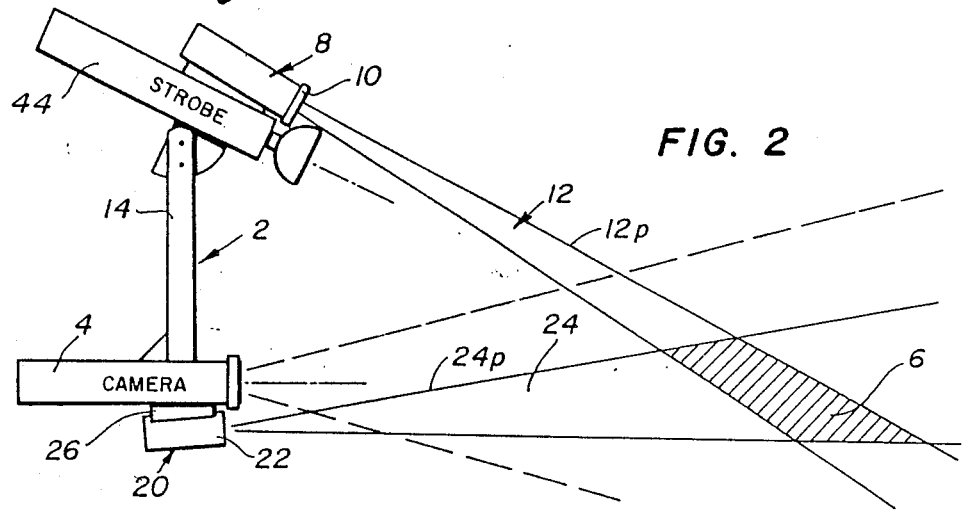
FIG. 2 is a lateral view of one embodiment of an improved underwater optical recording system of the invention.

Referring in detail to the drawings, in which identical parts are identically marked, the invention comprises improved apparatus 2 for underwater optical recording having a camera 4 to record scenes in a predetermined sector 6 forward thereof, defined by a minimum distance $d_1$ and a maximum distance $d_2$ from and perpendicular to the focal plane FP of the camera 4. There is a source 8 of modulated light having a wavelength in the range between about 650 & 700 nm. associated with optical means 10 to project a divergent conical light beam 12 having a divergency of $2\theta$, where is the maximum angle between the central axis 12a and periphery 12b of the beam 12 from the source 8. In preferred embodiments, the light source 8 is structured to project pulse modulated light.

Means 14 locates the optical means 10 spaced apart radially a distance D from the camera 4 to project the light beam 12 at an angle A relative to a plane P parallel to the focal plane of the camera 4 so that the beam 12 intersects the sector 6.

Receiver means 20 to detect and measure the intensity of light in the stated wavelength range is provided with optical means 22 to view a conical volume 24.

Means 26 locates optical unit 22 spaced apart radially from the camera 4 so the central axis 24a of the conical volume 24 intersects the central axis 12a of light beam 12 at point S in the sector 6. The intersecting peripheries 12p of the light beam and the intersecting peripheries 24p of the conical volume substantially define the boundaries of sector 6. Typically, the optical unit 22 will comprise a filter 28 plus at least one lens 30. Also, the receiver means 20 typically will comprise a detector 32 and a synchronous receiver 34 and the apparatus 20 further includes signal means 35.

A preferred light source 8 comprises at least one light emitting diode 36, a least one projection lens 38 and driver means 40 powered by the system controller 42. The system controller 42 typically will contain a source of electrical power, a master clock, start-up delay circuits, and square-wave drivers for the light source 8 and receiver 34. In the simplest version, a 50%-duty-cycle waveform is generated and the light source 8 is continuously modulated at a moderate frequency, e.g., 180 Hz.

Additionally, the apparatus 2 includes a strobe unit 44 to project high intensity light into the sector 6 coincidental with the camera exposure. The operation of strobe unit 44 will be controlled by the signal means 35 similar to the camera exposure.

Apparatus as described above constitutes the prior art equipment to which the improvements of the invention are applied.

Basically, such prior apparatus is improved by the addition of a nulling loop 50 in series between the receiver means 20 and the signal means 35. Such nulling loop 50 comprises a synchronous linear modulator 52, an algebraic subtracter 54, a synchronous demodulator 56 and a low-pass filter 58. [A demodulator is a circuit which operates on a time-varying function to produce a signal which is the amplitude component of the function. For example demodulation of the function A(t) sin ($2\pi$ ft ) would produce the component A(t).]

Light reaching the optical detector 32 will have three components:
1. Signal due to the specimen=S
2. Undesired signal due to the background=B
3. Uncorrelated noise due to ambient light=N The uncorrelated ambient light component will be substantially eliminated by the synchronous receiver 34 leaving the signal created by the subject and the background (S+B) to be processed as in the operation of the apparatus of U.S. Pat. No. 4,707,094.

Separation of the two components, S and B, can be accomplished if they have substantially different frequency spectrums. This will usually be the case since the background signal B will have slowly varying low frequency components (nearly stationary), and the signal from the subject S will typically have significantly higher frequency components. The nulling loop 50 can automatically subtract out the background leaving a signal A which is proportional to S and can therefore be used to actuate the signal means 35 which will trigger the camera 4.

The behavior of the nulling loop is as if there were a control element within the receiver means that constantly monitors the output signal from the synchronous receiver 34, looking for a slowly changing level. This change is interpreted by the control element as a change in the background signal. If the signal were to increase slightly, a small amount of compensating signal would be generated and injected so that the monitored signal would be forced to assume its original value. A more precise description of the nulling loop elements and their functional behavior follows.

The linear modulator 52 produces an output signal which is the algebraic product of two input signals. A conventional, four quadrant, analog multiplier circuit (for example an Analog Device, type AD532) can be used to perform a linear modulation function. By definition, the output of an analog multiplier $O_M$ is given by an equation of the form:

$$O_M = K_M(I_1 \times I_2)$$

where
$I_1$ = one of the input variables,
$I_2$ = the second input variable, and
$K_M$ = a conversion constant of the multiplier which accounts for dimensional units and scale factors.

In a four-quadrant multiplier either polarity of both input variables is allowed, and the output of the multiplier will assume the proper polarity as well as the correct magnitude. Thus, one input is a reference signal R which is nearly identical in waveshape and timing to the transmitted signal derived from the system controller 42. In the simplest version discussed above, the reference signal is a continuous, 50%—duty-cycle, square-wave, which varies between 0 volts and some convenient positive value.

The second input M is the output of the nulling loop 50. (Under steady state conditions, the signal M will be a low-level-dc-voltage which will be exactly the correct amplitude and polarity to cause the nulling loop to cancel out the background signal.) The output of the modulator (M×R) is presented to the negative input of a circuit called a subtracter (which performs the operation of substracting, algebraically, two input functions). The analog subtraction function can be provided by a conventional instrumentation amplifier (for example, Analog Devices, type AD521). The output of the subtractor $O_S$ is given by an equation of the form:

$$O_S = K_S(I_3 - I_4)$$

where
$I_3$ = the variable at the positive input terminal
$I_4$ = the variable at the negative input terminal, and
$K_S$ = a gain-constant for the amplifier which accounts for dimensional units.

The positive input of the subtracter is the output signal from the synchronous receiver (S+B).

When there is no target in the field-of-view (S=0), the output of the modulator is precisely equal to the background signal level, i.e., M×R=B. As a target enters the field-of-view, the balance of the loop 50 is disrupted and there is an output signal from the subtracter 54. The "unbalance signal" is amplified and synchronously demodulated, producing a positive voltage A, for an increasing subject signal S. This voltage is interpreted as a photographic subject entering the field-of-view. The synchronous demodulation function can be provided by a conventional analog multiplier circuit similar to the one used for the linear modulator. The output of the demodulator $O_{DM}$ is given by an equation of the form:

$$O_{DM} = K_{DM}(I_5 \times R)$$

where
$I_5$ = the input signal to be demodulated,
R = the reference signal, and
$K_{DM}$ = a conversion constant of the demodulator which accounts for dimensional units and scale factors.

Figure 3:
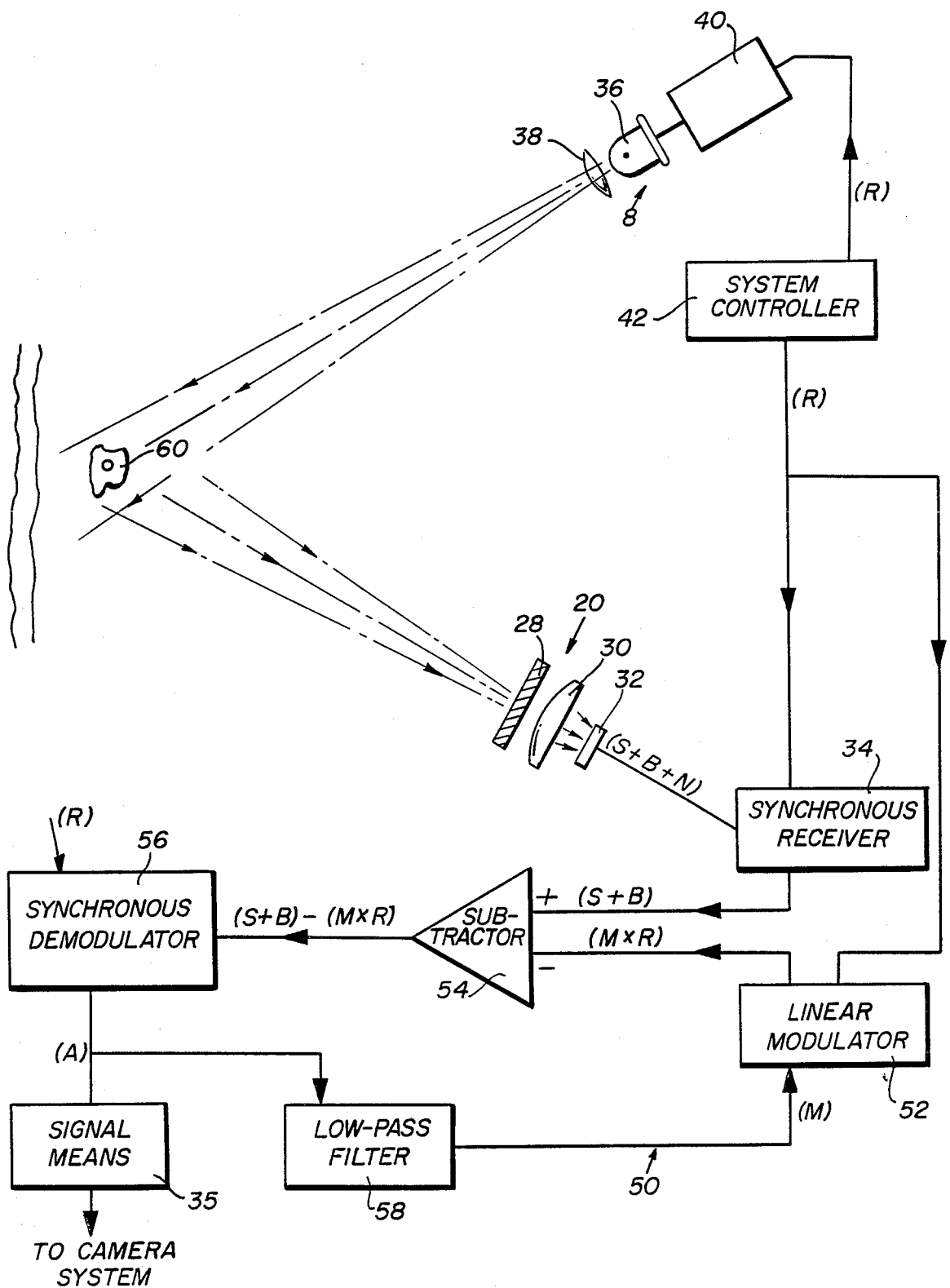
FIG. 3 is a schematic diagram of the system of FIG. 2.

In the embodiment diagrammed in FIG. 3, the reference signal is constrained to have either of two values, zero or a convenient fixed positive number. The low-pass filter 58 prevents the high-frequency components of he signal A from reaching the input of the linear modulator 52. On the other hand, if the background signal slowly changes (B increases or decreases very slowly), the output M of the nulling loop 50 will correspondingly change to re-establish a balance condition and this slowly changing component of the signal A will not be interpreted as a valid subject 60. Successful operation of this type of system requires that valid targets produce detector-signals substantially higher in frequency than those resulting from backgroung variations or system drifts.

The signal means 35, which typically includes a signal level detector and trigger means, is activated when it measures an intensity of light of the prescribed wavelength range in synchronization with the light source within the conical volume 24 above a predetermined minimum value. The signal means 35 may serve to have a operator manually make an exposure with the camera 4 via a remote control (not shown) or, preferably, the means 35 is coupled to the camera 4, e.g., via a solenoid (not shown), to automatically make the exposure.

In use of the apparatus 2, it will perform two functions, namely, (1) determine if there is a candidate subject in the sector 6 and (2) verify that the camera to subject distance is within the camera's depth of field. If both of these conditions are not met, there is no point in taking a photography with the camera 4.

The new systems 2 are contemplated to be used primarily in two situations. The first involves photographing objects in the presence of an optically cluttered background, i.e., a fish swimming in front of a rock. The second situation involves photographing a subject when there are nearly stationary objects in the vicinity of the subject, i.e., floating plankton.

Both applications involve unattended camera systems that photograph "targets of opportunity", i.e., take a photograph whenever something enters the photographic field. In such cases, the focus length and lens aperture are preset for the size of objects of interest. The new systems 2 will patiently wait for the something interesting to happen along. Such operation can be compared to the prevailing "shot-gun" approach in which periodic exposures are made hoping that a suitable object will be within range at the time.

The light source 8 advantageously operates with light in the range between visible and infra-red, e.g., in the range 650–700 nanometers. Infra-red is typically used in auto-focusing systems of surface cameras, but water strongly absorbs IR light, i.e., at 700 nm. the attenuation coefficient in clear water is approximately 0.6/m. Hence, over a range r of 3 meters, the light intensity is reduced to 17% of its initial intensity (e=0.17).

A simplified explanation of the new FOVAR systems of the invention can be made with reference to FIG. 1. The amplitude-modulated light source 8 is placed a distance D and the receiver means 20 a distance Dn laterally of the camera 4 with the central axis 12a of the light beam 12 at an angle A and the central axis 24a of the conical volume 24 at an angle An to plane P. The divergence of beam 12 is 2e, where e is the angle between the central axis 12a and the maximum distance to the periphery 12p of the beam 12. The divergence of the conical volume 24 can be similarly defined by reference to 24a and 24p.

The divergencies of the beam 12 and volume 24 may be varied for various purposes and effects and they may be the same or different and circular or eliptical. In this manner, in conjunction with the angles A and Ar, the size and shape of the sector 6 may be controlled.

In order to obtain good sensitivity and discrimination against stray light, either natural or artificial, the means 20 includes the synchronous receiver 34.

A wide range of geometrics, i.e., values of A, e, D, etc., can be used to accommodate the apparatus 2 to the type and size of subjects to be photographed. For example, one configuration can be optimized for small objects at short range, i.e., macro-photography.

Preferably the source 8 Will use a high-efficiency, light emitting diode which has a built in lens so that its output is focused into a narrow beam, e.g., an LED with output power of about 20 mW so the peak power required to operate it is about 200 mW. Such LEDs are selected to emit in the stated wavelength range. Bioluminescent interference, primarily observed from 455–495 nm, is, thus, minimized since few submarine organisms emit light at wavelengths above 600 nm. Likewise, skylight (both sunlight and moonlight) is increasingly attenuated at wavelengths greater than 600 nm. Operation at wavelengths above 700 nm is undesirable due to the rapid increase of water absorption coefficient, making triggering unreliable except at short range.

The preferred LEDs will emit primarily in the range of 640–680 nm. This is sufficiently narrow to allow rejection of ambient light, especially using optical filters, e.g., 28, in the receiver means 20.

During typical operation, the FOVAR system is pulse modulated at 50% duty cycle as determined by the timer in the system controller 42. An illumination angle of about 80°, in water, can be achieved after refraction of the beam through a fused quartz window. When a photographic subject is present in the sector 6, a small amount of the projected light will be reflected and returned to means 20 and will be related to the size and reflectance of the subject. The returned light is focused onto a PIN silicon detector 32 by lens 30 after passing through an ambient-light-rejecting filter 28. The synchronous receiver 34 processes the received signal. Much of the system noise from various sources, e.g., ambient light, thermal noise, etc., are suppressed by synchronous detection, resulting in reliable operation of the system 2.

Controls are advantageously included in the circuitry to allow selection of external, manual or local, automatic triggering. Likewise, receiver gain and detector threshold values can be selected to optimize the system for any particular operation situation.

The embodiments of the invention in which an exclusive property or privilege is claimed are defined as follows:

1. In apparatus for underwater optical recording including a camera to record scenes in a predetermined sector forward thereof, first optical means spaced apart radially from said camera to project a divergent light beam so that it intersects said predetermined sector, receiver means to detect and measure the intensity of light provided with second optical means spaced apart radially from said camera to view a conical volume that intersects said light beam and the intersecting peripheries of said light beam and said conical volume substantially define said predetermined sector, and signal means that is activated by said receiver means when it measures an intensity of light in said predetermined sector above a predetermined minimum value, the improvement of a nulling loop in series between said receiver means and said signal means, said nulling loop comprising a synchronous linear modulator, an algebraic subtracter, a synchronous demodulator and a low-pass filter.

2. The apparatus of claim 1 wherein said receiver means includes a detector to receive light that passes through said second optical means.

3. The apparatus of claim 1 wherein said second optical means comprises a lens and a filter.

4. The apparatus of claim 1 where said light beam is pulse modulated light and said receiver means is a synchronous receiver.

5. The apparatus of claim 1 wherein said light beam is created by a light emitting diode and has a wavelength in the range between about 650 & 700 nm.

6. The apparatus of claim 5 wherein said diode is driven to emit square wave modulated light.

7. In apparatus for underwater optical recording comprising a camera to record scenes in a predetermined sector forward thereof, a source of light having a wavelength in the range between about 650 & 700 nm. spaced apart radially from said camera provided with first optical means to project from said source a conical light beam so that the central axis thereof intersects said predetermined sector, receiver means to detect and measure the intensity of light in said wavelength range provided with second optical means spaced apart from said camera that views a conical volume the central axis of which intersects said central axis of said light beam and the intersecting peripheries of said light beam and said conical volume substantially define said predetermined sector, and signal means that is activated by said receiver means when it measures an intensity of light in said wavelength range above a predetermined minimum value to cause said camera to record, the improvement of a nulling loop in series between said receiver means and said signal means, said nulling loop comprising a synchronous linear modulator, an algebraic subtracter, a synchronous demodulator and a low-pass filter.

8. In a method for underwater optical recording in which a camera records scenes in a predetermined sector forward thereof, a divergent beam of modulated light is projected from a source spaced apart radially of said camera so that said beam intersects said predetermined sector, light existing in a divergent conical volume the apex of which is spaced apart radially from said camera so that said conical volume intersects said light beam and the intersecting peripheries of said light beam and said conical volume substantially define said predetermined sector is detected, the resulting detected light signal is analyzed to determine when it reaches an intensity above a predetermined value, and said camera is automatically made to record when said value is exceeded, the improvement which comprises:

separating said light signal into a low frequency component and a higher frequency component, generating a reference signal substantially identical in amplitude and polarity to that of said low frequency component, employing said reference signal to nullify said low frequency component, and using said higher frequency component to determine when said intensity is above said predetermined value.

9. The method for underwater optical recording according to claim 8 wherein said light has a wavelength in the range between about 650 & 700 nm.

10. The method of claim 9 which includes the step of projecting a beam of high intensity light into said predetermined sector when said intensity is above said predetermined value.

11. The method of claim 10 wherein said light is pulse modulated light.

* * * * *